(12) United States Patent
Street et al.

(10) Patent No.: US 11,593,486 B2
(45) Date of Patent: Feb. 28, 2023

(54) SYSTEM AND METHOD OF OPERATING AN INFORMATION HANDLING SYSTEM

(71) Applicant: Dell Products L.P., Round Rock, TX (US)

(72) Inventors: James H. Street, Grafton, MA (US); Brandon Charles Barney, Hudson, MA (US); Richard John Boyle, Grafton, MA (US); Renee J. Walker, Grafton, MA (US); Andrew Wrobel, Oxford, MA (US)

(73) Assignee: Dell Products L.P., Round Rock, TX (US)

( * ) Notice: Subject to any disclaimer, the term of this patent is extended or adjusted under 35 U.S.C. 154(b) by 404 days.

(21) Appl. No.: 16/938,548

(22) Filed: Jul. 24, 2020

(65) Prior Publication Data

US 2022/0027474 A1    Jan. 27, 2022

(51) Int. Cl.

| G06F 21/57 | (2013.01) |
|---|---|
| G06F 21/44 | (2013.01) |
| G06F 1/3287 | (2019.01) |
| G06F 9/54 | (2006.01) |
| G06F 1/3228 | (2019.01) |
| G06F 9/4401 | (2018.01) |

(52) U.S. Cl.
CPC .......... *G06F 21/572* (2013.01); *G06F 1/3228* (2013.01); *G06F 1/3287* (2013.01); *G06F 9/4401* (2013.01); *G06F 9/542* (2013.01); *G06F 21/44* (2013.01)

(58) Field of Classification Search
CPC .............................. G06F 21/44; G06F 21/572
See application file for complete search history.

(56) References Cited

U.S. PATENT DOCUMENTS

| 10,673,439 B1 * | 6/2020 | Ahmad ............ H03K 19/17728 |
| 2014/0365755 A1 * | 12/2014 | Liu ....................... G06F 21/572 713/2 |

(Continued)

OTHER PUBLICATIONS

Enger, Nathan. "Power Supply Sequencing Simplified." LT Journal of Analog Innovation, Aug. 2016 (10-13), Aug. 2016.

(Continued)

*Primary Examiner* — William S Powers
(74) *Attorney, Agent, or Firm* — McDermott Will & Emery LLP

(57) ABSTRACT

In one or more embodiments, one or more systems, one or more methods, and/or one or more processes may determine that a platform reset signal from a processor of an information handling system has been asserted; may determine that a power conservation state from the processor was not asserted within an amount of time; may determine that an operating system restart occurred; may notify a hardware root of trust device to authenticate information handling system firmware; may assert a resume reset signal to the processor; may authenticate the information handling system firmware; may de-assert a power OK signal to the processor; may remove power from the processor; may determine that the resume reset signal to the processor is de-asserted and that the processor is out of the power conservation state; and may provide power to the processor.

19 Claims, 6 Drawing Sheets

(56) References Cited

U.S. PATENT DOCUMENTS

| | | | |
|---|---|---|---|
| 2015/0012737 A1* | 1/2015 | Newell | G06F 21/44 |
| | | | 713/2 |
| 2016/0063254 A1* | 3/2016 | Jeansonne | G06F 21/575 |
| | | | 713/2 |
| 2016/0217009 A1* | 7/2016 | Farhan | G06F 9/4881 |
| 2019/0073478 A1* | 3/2019 | Khessib | G06F 13/4072 |
| 2020/0151336 A1* | 5/2020 | Maletsky | G06F 21/572 |
| 2021/0124711 A1* | 4/2021 | Ansari | G06F 21/60 |

OTHER PUBLICATIONS

Schneier, Bruce. *Applied Cryptography: Protocols, Algorithms, and Source Code in C.* John Wiley & Sons, 1996; 662 pages, 1996.
Advanced Configuration and Power Interface Specification, Unified EFI Forum, Inc., Version 6.2, May 2017, May 2017.
PCI Express Base Specification Revision 3.0, Nov. 10, 2010, Nov. 10, 2010.

\* cited by examiner

SYSTEM AND METHOD OF OPERATING AN INFORMATION HANDLING SYSTEM

BACKGROUND

Field of the Disclosure

This disclosure relates generally to information handling systems and more particularly to operating an information handling system and authenticating information handling system firmware.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine that a platform reset signal from a processor of an information handling system has been asserted; may determine that a power conservation state from the processor was not asserted within a first amount of time; may determine that an operating system restart occurred; may notify, via a first notification, a hardware root of trust (HWRoT) device to authenticate information handling system firmware (IHSFW); may assert a resume reset signal to the processor; may authenticate the IHSFW; may de-assert a power OK signal to the processor; may remove power from the processor; may determine that the resume reset signal to the processor is de-asserted and that the processor is out of the power conservation state; and may provide power to the processor.

In one or more embodiments, the HWRoT device may receive a notification. For example, the HWRoT device may receive the first notification. For instance, the HWRoT device may authenticate the IHSFW in response to receiving the first notification. In one or more embodiments, the one or more systems, the one or more methods, and/or the one or more processes may further, after a runtime reset of the information handling system, determine that a notification to re-authenticate the IHSFW has not been received within a second amount of time transpiring and may further, in response to determining that the notification to re-authenticate the IHSFW has not been received within the second amount of time transpiring, determine that a power sequencer device has been compromised. For example, the one or more systems, the one or more methods, and/or the one or more processes may further, after a runtime reset of the information handling system, determine that a second notification to re-authenticate the IHSFW has not been received within a second amount of time transpiring.

In one or more embodiments, the one or more systems, the one or more methods, and/or the one or more processes may further determine that the power conservation state was de-asserted within a second amount of time and may further determine that the power sequencer device has been compromised. In one or more embodiments, determining that the resume reset signal to the processor is de-asserted may include determining, via an output of a logical AND gate, that the resume reset signal to the processor is de-asserted. In one or more embodiments, the power sequencer device may provide a first resume reset signal to the logical AND, and the HWRoT device may provide a second resume reset signal to the logical AND gate. In one or more embodiments, at least one of the first signal and the second signal is a logical false signal.

In one or more embodiments, authenticating the IHSFW may include obtaining a signature of the IHSFW from a non-volatile memory medium of the information handling system. In one or more embodiments, authenticating the IHSFW may include: determining a first hash value of the IHSFW; decrypting the signature of the IHSFW with a public encryption key to obtain a second hash value; and determining that the first hash value matches the second hash value. In one or more embodiments, the power sequencer device may include a first microcontroller, and the HWRoT device may include a second microcontroller, different from the first microcontroller.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
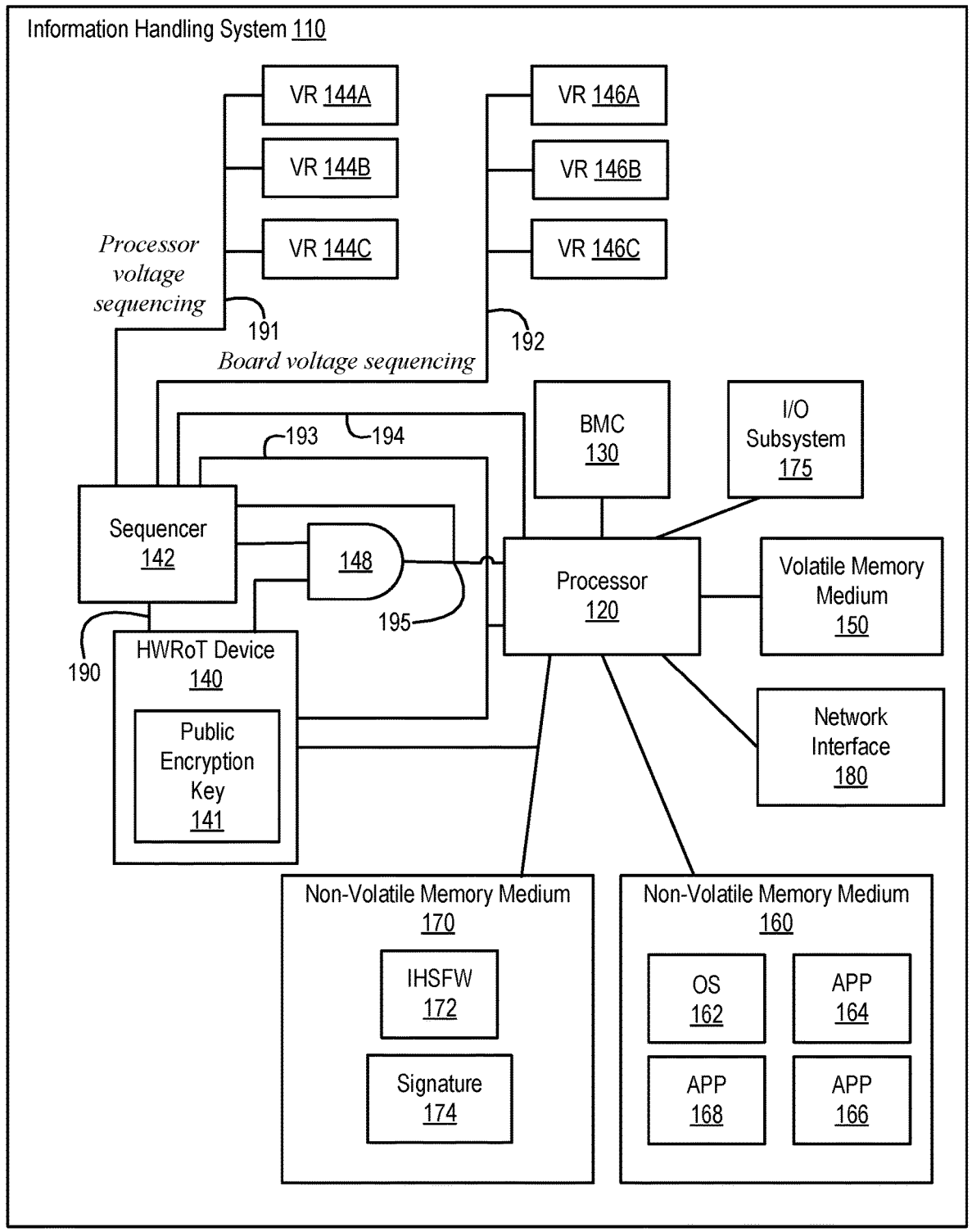
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '11A' may refer to a particular instance of a particular class/type, and the reference '11' may refer to a collection of instances belonging to that particular class/type or any one instance of that class/type in general.

In one or more embodiments, a processor of an information handling system (e.g., a central processing unit of an information handling system) may not include integrated hardware root of trust (HWRoT) capabilities. In this case, an external HWRoT device may be utilized to provide HWRoT capabilities. As an example, a HWRoT device may be integrated into a non-volatile memory medium that may store information handling system firmware (IHSFW). However, this example configuration may pose one or more issues during runtime resets, and another configuration may be more beneficial.

In one or more embodiments, a HWRoT device may hold the processor of the information handling system in reset while authenticating the IHSFW after the HWRoT device has detected a platform reset (PLTRST) initiated from the processor of the information handling system. Permitting an external HWRoT device to hold the processor of the information handling system in reset by asserting a processor "resume reset" (RSMRST) signal while the external HWRoT device authenticates the IHSFW for one or more runtime resets may pose one or more issues. In one example, an issue may include an incorrect voltage sequencing to the processor of the information handling system during a runtime warm reset. In a second example, an issue may include the processor of the information handling system unexpectedly entering a built-in self-test (BIST) mode when asserting RSMRST for any length of time while "power OK" (PWROK) is asserted to the processor of the information handling system. For instance, when PWROK is asserted to the processor of the information handling system, the processor of the information handling system may determine that the processor of the information handling system may consume power to process a workload, boot an operating system, and/or execute a set of instructions. In a third example, an issue may include a thermal event of the processor of the information handling system occurring due to excess current draw when unexpectedly entering a BIST mode. In a fourth example, an issue may include the processor of the information handling system taking an internal unrecoverable error (IERR) when asserting RSMRST while other motherboard board and/or processor voltages and PWROK are up. In another example, an issue may include an unexpected behavior of runtime reset types. In one instance, the processor of the information handling system may change its behavior on an operating system restart to behave similarly to an operating system shutdown. In another instance, the processor of the information handling system may change its behavior on an operating system restart to behave similarly to a cold reset behavior.

In one or more embodiments, during a full power cycle, the one or more issues incurred for runtime resets may not be applicable as the processor of the information handling system is held in reset by the HWRoT device on power up before processor voltage delivery conductors have been sequenced to provide power. In one or more embodiments, differentiating runtime reset types, which may include operating system restart, operating system shutdown, and/or a cold reset, among others, for proper voltage sequencing may be requisite to avoid the one or more issues.

In one or more embodiments, a power sequencer device may be utilized to differentiate among operating system restart, operating system shutdown, and cold reset runtime conditions, among others, by monitoring a power conservation state signal and a PLTRST signal from the processor of the information handling system. For example, when the power sequencer device determines a runtime reset type, the power sequencer device may sequence voltages of the processor of the information handling system and voltages of the motherboard appropriately to maintain an expected reset behavior. After determining the runtime reset type and sequencing the voltages of the processor of the information handling system and the voltages of the motherboard, the power sequencer device may notify a HWRoT device to authenticate IHSFW. For example, this may avert the HWRoT device from interfering with proper voltage sequencing of the processor for runtime resets.

In one or more embodiments, the HWRoT device may be configured to determine if the power sequencer device has been compromised. For example, the HWRoT device may not receive a notification, in an amount of time transpiring, from the power sequencer device to authenticate the IHSFW after a runtime reset may have occurred and may determine that the power sequencer device has been compromised.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175, and a network interface 180, among others, may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

As illustrated, IHS 110 may include a HWRoT device 140. As shown, IHS 110 may include a sequencer 142 (e.g., a power sequencer device). As illustrated, HWRoT device 140 may be coupled to one or more of processor 120, sequencer 142, and a logical AND gate 148. As shown, HWRoT device 140 may be coupled a coupling that couples non-volatile memory medium 170 to processor 120. For example, the coupling that couples non-volatile memory medium 170 to processor 120 may include a bus. For instance, HWRoT device 140 may be coupled to the bus that couples non-volatile memory medium 170 to processor 120. In one or more embodiments, non-volatile memory medium 170 may include a SPI flash memory device. For example, HWRoT device 140 may be coupled to a SPI bus that couples non-volatile memory medium 170 to processor 120.

In one or more embodiments, HWRoT device 140 may include a microcontroller. For example, HWRoT device 140 may be implemented via a microcontroller. In one or more embodiments, the microcontroller may include cryptographic functionality. As shown, HWRoT device 140 may include a public encryption key 141. In one example, HWRoT device 140 may decrypt data utilizing public encryption key 141. For instance, HWRoT device 140 may decrypt a signature 174 (e.g., an encrypted hash value) utilizing public encryption key 141. In another example, HWRoT device 140 may encrypt data utilizing public encryption key 141. In one or more embodiments, HWRoT device 140 may determine a hash value of data. For example, HWRoT device 140 may determine a hash value of IHSFW 172. For instance, HWRoT device 140 may utilize a one-way hash function to determine a hash value of IHSFW 172. In one or more embodiments, HWRoT device 140 may authenticate IHSFW 172. As an example, HWRoT device 140 may automatically authenticate IHSFW 172 when IHS 110 is powered up. As another example, HWRoT device 140 may authenticate IHSFW 172 after a reset. In one or more embodiments, HWRoT device 140 may wait for a signal from sequencer 142 before authenticating IHSFW 172 after a reset. For example, HWRoT device 140 may re-authenticate IHSFW 172 after receiving a signal from sequencer 142.

In one or more embodiments, sequencer 142 may include a microcontroller. For example, sequencer 142 may be implemented via a microcontroller. In one or more embodiments, the microcontroller of sequencer 142 may be different from the microcontroller of HWRoT device 140. As shown, sequencer 142 may be coupled to HWRoT device 140 via a coupling 190. In one or more embodiments, sequencer 142 may signal HWRoT device 140 to authenticate or to re-authenticate IHSFW 172 via coupling 190. For example, coupling 190 may include a conductor that conducts one or more signals from sequencer 142 to HWRoT device 140. In one or more embodiments, HWRoT device 140 may wait for a notification from sequencer 142 before HWRoT device 140 may authenticate or may re-authenticate IHSFW 172. For example, after detecting a runtime reset, HWRoT device 140 may wait for a notification from sequencer 142 before HWRoT device 140 may authenticate or may re-authenticate IHSFW 172. In one or more embodiments, HWRoT device 140 may determine that sequencer 142 is compromised if HWRoT device 140 does not receive a notification from sequencer 142 before an amount of time transpires. For example, determining that sequencer 142 is compromised may prevent damage to one or more portions and/or one or more components of IHS 110.

As shown, IHS 110 may include voltage regulators (VRs) 144A-144C. As illustrated, sequencer 142 may be coupled to VRs 144A-144C. In one or more embodiments, sequencer 142 may be coupled to VRs 144A-144C via one or more couplings 191. For example, sequencer 142 may provide processor voltage sequencing to VRs 144A-144C via the one or more couplings 191. As shown, IHS 110 may include VRs 146A-146C. As illustrated, sequencer 142 may be coupled to VRs 146A-146C. In one or more embodiments, sequencer 142 may be coupled to VRs 146A-146C via one or more couplings 192. For example, sequencer 142 may provide circuit board (e.g., motherboard) voltage sequencing to VRs 146A-146C via the one or more couplings 192.

As illustrated, processor 120 may be coupled to HWRoT device 140 and sequencer 142 via a coupling 193. In one or more embodiments, processor 120 may provide a PLTRST signal to HWRoT device 140 and sequencer 142 via coupling 193. In one or more embodiments, processor 120 may provide a sleep state signal to sequencer 142 via a coupling 194. For example, sequencer 142 may determine one or more sleeps states (e.g., ACPI sleep states) of processor 120 via coupling 194. In one or more embodiments, sequencer 142 may receive a RSMRST signal via a coupling 195. In one or more embodiments, AND gate 148 may synchronize a first RSMRST signal from HWRoT device 140 and a second RSMRST signal from sequencer 142. For example, a RSMRST signal may be provided to processor 120 if the first RSMRST signal matches the second RSMRST signal. For instance, processor 120 may receive a logical true value via RSMRST if the first RSMRST signal is a logical true value and the second RSMRST signal is a logical true. In one or more embodiments, processor 120 may utilize negative logic with a RSMRST signal. In on example, if processor 120 receives a logical true from coupling 195, processor 120 may be configured to determine a logical false. In another example, if processor 120 receives a logical false from coupling 195, processor 120 may be configured to determine a logical true. When processor 120 receiving a signal via coupling 195, AND gate 148 may provide a logical false signal to processor 120 if at least one of a first RSMRST signal from HWRoT device 140 and a second RSMRST signal from sequencer 142 is a logical false.

Figure 2A:
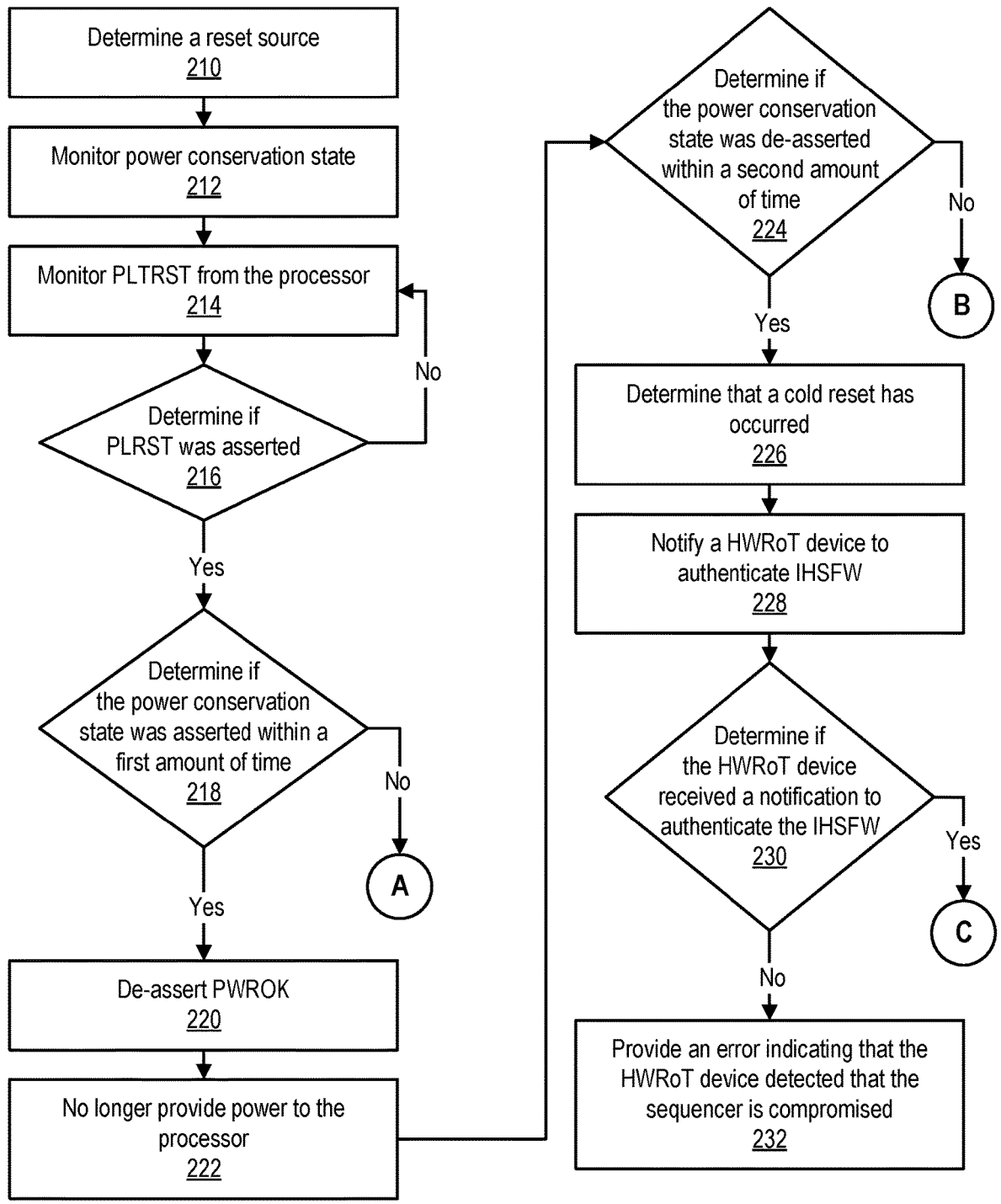
FIGS. 2A-2C illustrate an example of a method of operating an information handling system, according to one or more embodiments.
Figure 2B:
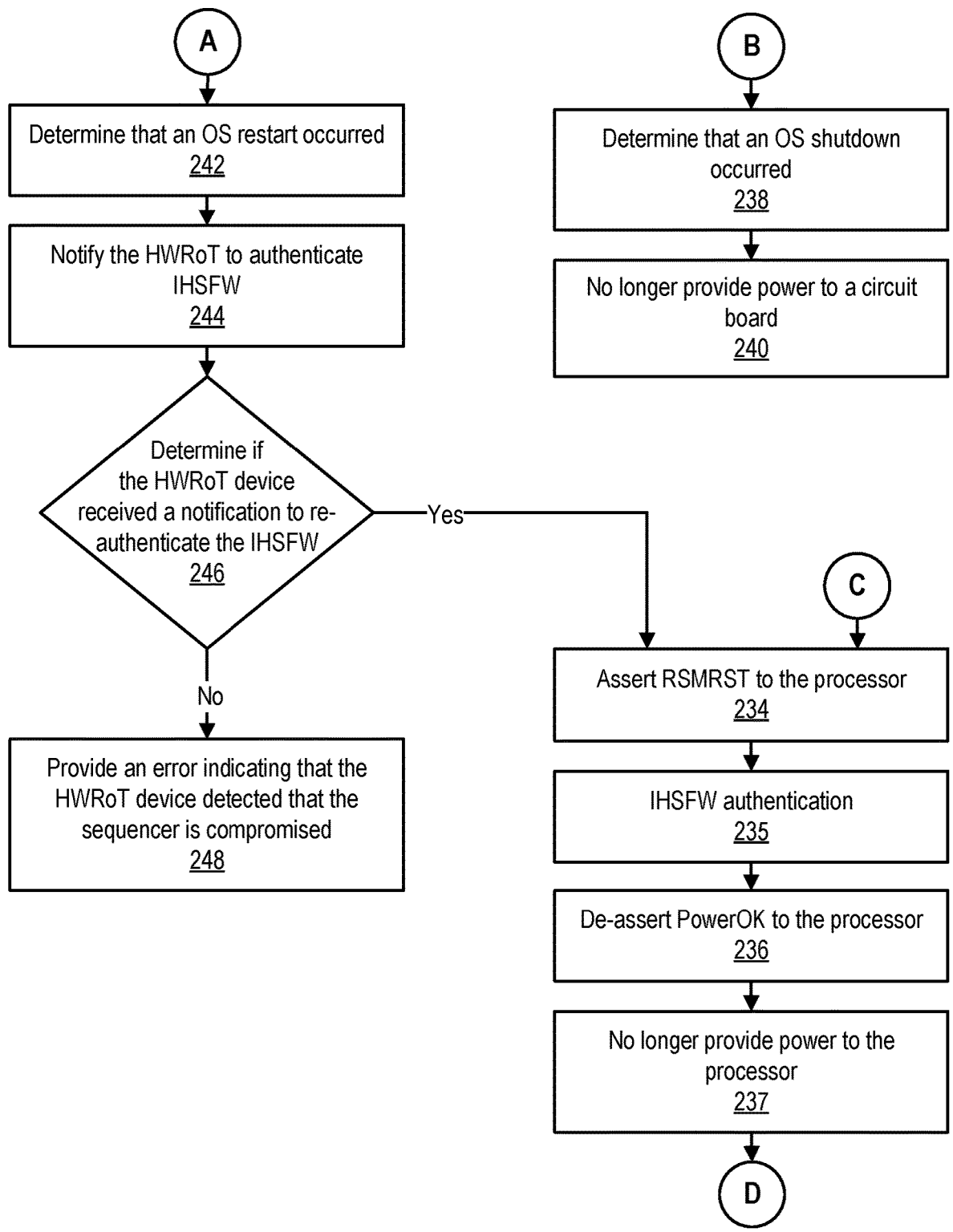
Figure 2C:
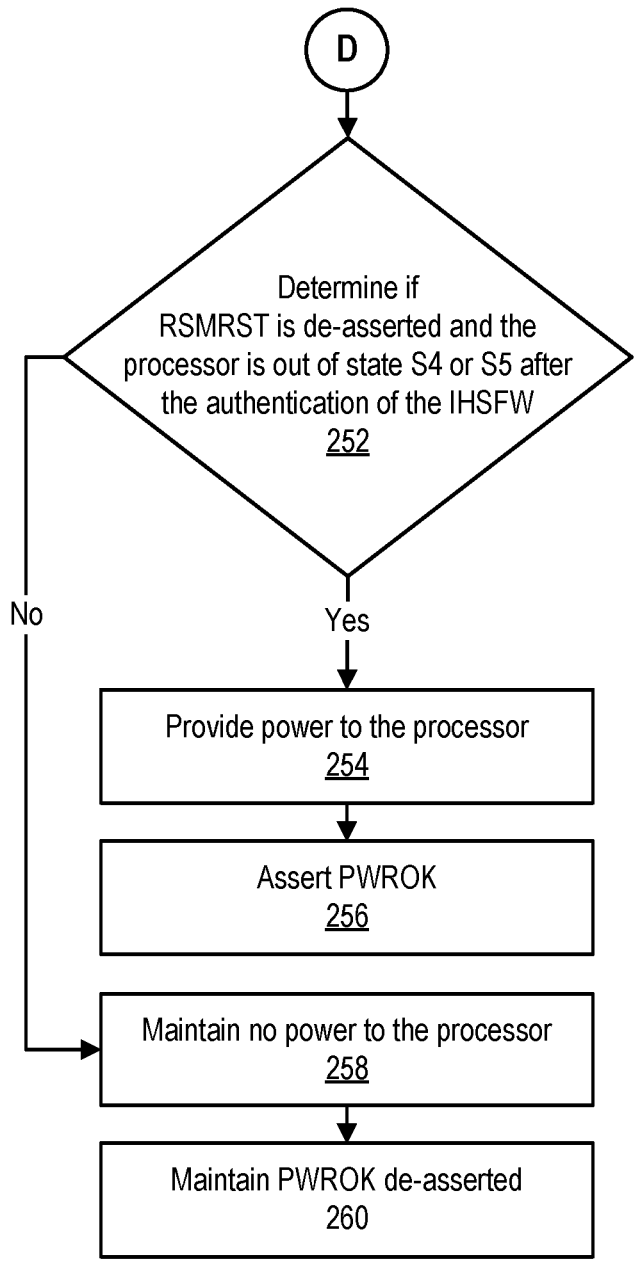

Turning now to FIGS. 2A-2C, an example of a method of operating an information handling system is illustrated, according to one or more embodiments. At 210, a reset source may be determined. For example, sequencer 142 may determine a reset source. In one instance, the reset source may include a cold reset. In another instance, the reset source may include an operating system restart or operating system shutdown.

At 212, power conservation state may be monitored. For example, sequencer 142 may monitor power conservation state. In one or more embodiments, the power conservation state may be a power state of processor 120. For example, a power state of processor 120 may include an ACPI sleep state. In one instance, an ACPI sleep state "S0" may include a normal powered-on state. In a second instance, an ACPI sleep state "S1" may include a low wake latency sleeping state (e.g., no system context may be lost). In a third instance, an ACPI sleep state "S2" may be supported at a future time. In a fourth instance, an ACPI sleep state "S3" may include a low wake latency sleeping state where processor and system cache context may be lost (e.g., an OS may be responsible for maintaining processor and system cache context). In a fifth instance, an ACPI sleep state "S4" may include a lowest power, longest wake latency sleeping state that may be supported by ACPI (e.g., all devices of the hardware platform may be powered off and platform context may be maintained). In another instance, an ACPI sleep state "S5" may include a powered off state (e.g., some devices, such as a network adapter, a USB port, etc., may remain powered by standby voltage, which may permit a wake-up of IHS 110).

At 214, a PLTRST from the processor may be monitored. For example, sequencer 142 may monitor a PLTRST from processor 120. At 216, it may be determined if the PLTRST was asserted. For example, sequencer 142 may determine if the PLTRST was asserted. If the PLTRST was not asserted, the method may proceed to 214. If the PLTRST was asserted, it may be determined if the power conservation state was asserted within a first amount of time, at 218. For example, sequencer 142 may determine if the power conservation state was asserted within a first amount of time. For instance, the power conservation state may be ACPI sleep state S4 or ACPI sleep state S5. As an example, determining if the power conservation state was asserted within the first amount of time may include determining if a signal indicating that the processor entered ACPI sleep state S4 or ACPI sleep state S5 was asserted. In one or more embodiments, the first amount of time may be a few microseconds. For example, the first amount of time may less than one hundred microseconds.

If the power conservation state was asserted within the first amount of time, PWROK may be de-asserted, at 220. For example, sequencer 142 may de-assert PWROK. At 222, power may no longer be provided to the processor. For example, sequencer 142 may no longer provide power to processor 120. In one instance, no longer providing power to processor 120 may include sequencer 142 controlling a voltage regulator (VR) 144 to no longer provide power to processor 120. In another instance, no longer providing power to processor 120 may include sequencer 142 removing power from power rails that provide power to processor 120.

At 224, it may be determined if the power conservation state was de-asserted within a second amount of time. For example, sequencer 142 may determine if the power conservation state was de-asserted within a second amount of time. In one or more embodiments, the second amount of time may be an amount of time up to six seconds. For example, the second amount of time may be orders of magnitude different from the first amount of time.

If the power conservation state was de-asserted within the second amount of time, it may be determined that a cold reset has occurred, at 226. For example, sequencer 142 may determine that a cold reset has occurred. In one or more embodiments, a cold reset may include removing power from processor 120. For example, sequencer 142 may determine that power has been removed from processor 120. At 228, a HWRoT device may be notified to authenticate IHSFW of the information handling system. For example, sequencer 142 may notify, via a first notification, HWRoT device 140 to authenticate IHSFW 172. At 230, it may be determined if the HWRoT device received a notification to authenticate the IHSFW. For example, HWRoT device 140 may determine if HWRoT device 140 received a notification to authenticate IHSFW 172.

If the HWRoT device has not received the notification to re-authenticate the IHSFW, an error indicating that the HWRoT device detected that the sequencer is compromised may be provided, at 232. For example, HWRoT device 140 may provide an error indicating that the HWRoT device detected that sequencer 142 is compromised. In one or more embodiments, HWRoT device 140 may provide an error indicating that the HWRoT device detected that sequencer 142 is compromised to sequencer 142. For example, a component of IHS 110 may poll sequencer 142 in determining if there is an error associated with sequencer 142. For instance, BMC 130 may poll sequencer 142 in determining if there is an error associated with sequencer 142. In one or more embodiments, HWRoT device 140 may provide, to BMC 130, an error indicating that the HWRoT device detected that sequencer 142 is compromised.

If the HWRoT device has received the notification to re-authenticate the IHSFW, RSMRST may be asserted to the processor, at 234. For example, sequencer 142 may assert RSMRST to processor 120. At 235, the IHSFW may be authenticated. For example, HWRoT device 140 may authenticate IHSFW 172. In one instance, HWRoT device 140 may authenticate IHSFW 172 in response to determining that HWRoT device has received a notification to re-authenticate the IHSFW. In another instance, HWRoT device 140 may authenticate IHSFW 172 in response to determining that HWRoT device has received a notification to authenticate the IHSFW. In one or more embodiments, a notification to authenticate the IHSFW and/or a notification to re-authenticate the IHSFW may include an assertion of a logical true signal to HWRoT device 140. For example, the notification to authenticate the IHSFW and/or the notification to re-authenticate the IHSFW may include the assertion of the logical true signal to HWRoT device 140 via coupling 190. In one or more embodiments, HWRoT device 140 may authenticate IHSFW 172 via an example of a method described with reference to FIG. 4.

At 236, PowerOK (i.e., power OK) may be de-asserted to the processor of the information handling system. For example, sequencer 142 may de-assert PowerOK to processor 120. At 237, power may no longer be provided to the processor of the information handling system. For example, sequencer 142 may no longer provide power to processor 120. In one instance, no longer providing power to processor 120 may include sequencer 142 controlling a VR 144 to no longer provide power to processor 120. In another instance, no longer providing power to processor 120 may include sequencer 142 removing power from power rails that provide power to processor 120.

At 252, it may be determined if RSMRST is de-asserted and the processor is out of ACPI sleep state S4 or ACPI sleep state S5 after the authentication of the IHSFW. For example, sequencer 142 may determine if RSMRST is de-asserted and the processor is out of ACPI sleep state S4 or ACPI sleep state S5 after the authentication of IHSFW 172. For instance, sequencer 142 may determine if RSMRST is de-asserted and the processor is no longer in ACPI sleep state S4 or ACPI sleep state S5 after the authentication of IHSFW 172. If RSMRST is de-asserted and the processor is out of state ACPI sleep state S4 or ACPI sleep state S5 after the authentication of the IHSFW, power may be provided to the processor of the information handling system, at 254. For example, sequencer 142 may provide power to processor 120. In one instance, providing power to processor 120 may include sequencer 142 controlling a VR 144 to provide power to processor 120. In another instance, providing power to processor 120 may include sequencer 142 providing power to power rails that provide power to processor 120. At 256, PWROK may be asserted. For example, sequencer 142 may assert PWROK.

If RSMRST is not de-asserted or the processor is not out of ACPI sleep state S4 or ACPI sleep state S5 after the authentication of the IHSFW, no power to the processor may be maintained, at 258. For example, sequencer 142 may maintain no power to the processor. In one or more embodiments, sequencer 142 maintaining no power to the processor rails may include sequencer 142 maintaining no power to processor 120. In one example, maintaining no power to processor 120 may include sequencer 142 controlling a VR 144 to not provide power to processor 120. In another instance, maintaining no power to processor 120 may include sequencer 142 maintaining no power to power rails that can provide power to processor 120. At 260, PWROK may be maintained as de-asserted. For example, sequencer 142 may maintain PWROK as de-asserted.

With reference again to method element 224, if the power conservation state was not de-asserted within the second amount of time, it may be determined that an OS shutdown occurred, at 238. For example, sequencer 142 may determine that an OS shutdown occurred. For instance, sequencer 142 may determine that a shutdown of OS 162 occurred. At 240, power may no longer be provided to a circuit board (e.g., a motherboard) of the information handling system.

For example, sequencer 142 may no longer provide power to a circuit board of IHS 110. In one instance, no longer providing power to the circuit board may include sequencer 142 controlling a VR 146 to no longer provide power to the circuit board. In one instance, no longer providing power to the circuit board may include sequencer 142 removing power from power rails that provide power to the circuit board. In one or more embodiments, the circuit board of the information handling system may include a motherboard of the information handling system.

With reference again to method element 218, if the power conservation state was not asserted within the first amount of time, it may be determined that an OS restart has occurred, at 242. For example, sequencer 142 may determine that an OS restart has occurred. At 244, a HWRoT device may be notified to authenticate IHSFW. For example, sequencer 142 may notify HWRoT device 140 to authenticate IHSFW 172. For instance, sequencer 142 may notify, via a second notification, HWRoT device 140 to authenticate IHSFW 172.

In one or more embodiments, HWRoT device 140 may store a public encryption key. For example, IHSFW 172 may be signed with a private encryption key associated with the public encryption key. For instance, HWRoT device 140 may determine if IHSFW 172 is authenticated based at least on a digital signature of IHSFW 172 and the public encryption key. In one or more embodiments, utilizing an example of a method described with reference to FIG. 4, HWRoT device 140 may determine if IHSFW 172 is authenticated based at least on a digital signature of IHSFW 172 and the public encryption key. For example, HWRoT device 140 may determine if IHSFW 172 is authenticated based at least on signature 174 of IHSFW 172 and public encryption key 141. Although FIG. 1 illustrates that non-volatile memory medium 170 stores signature 174, HWRoT device 140 may store signature 174, according to one or more embodiments.

At 246, it may be determined if the HWRoT device received a notification to re-authenticate the IHSFW. For example, HWRoT device 140 may determine if HWRoT device 140 received a notification to re-authenticate IHSFW 172. If the HWRoT device received the notification to re-authenticate the IHSFW, the method may proceed to 234. If the HWRoT device did not receive the notification to re-authenticate the IHSFW, an error indicating that the HWRoT device detected that the sequencer is compromised may be provided, at 248. For example, HWRoT device 140 may provide an error indicating that HWRoT device 140 detected that sequencer 142 is compromised. In one or more embodiments, HWRoT device 140 may provide, to sequencer 142, an error indicating that the HWRoT device detected that sequencer 142 is compromised. For example, a component of IHS 110 may poll sequencer 142 in determining if there is an error associated with sequencer 142. For instance, BMC 130 may poll sequencer 142 in determining if there is an error associated with sequencer 142. In one or more embodiments, HWRoT device 140 may provide, to BMC 130, an error indicating that the HWRoT device detected that sequencer 142 is compromised.

Figure 3:
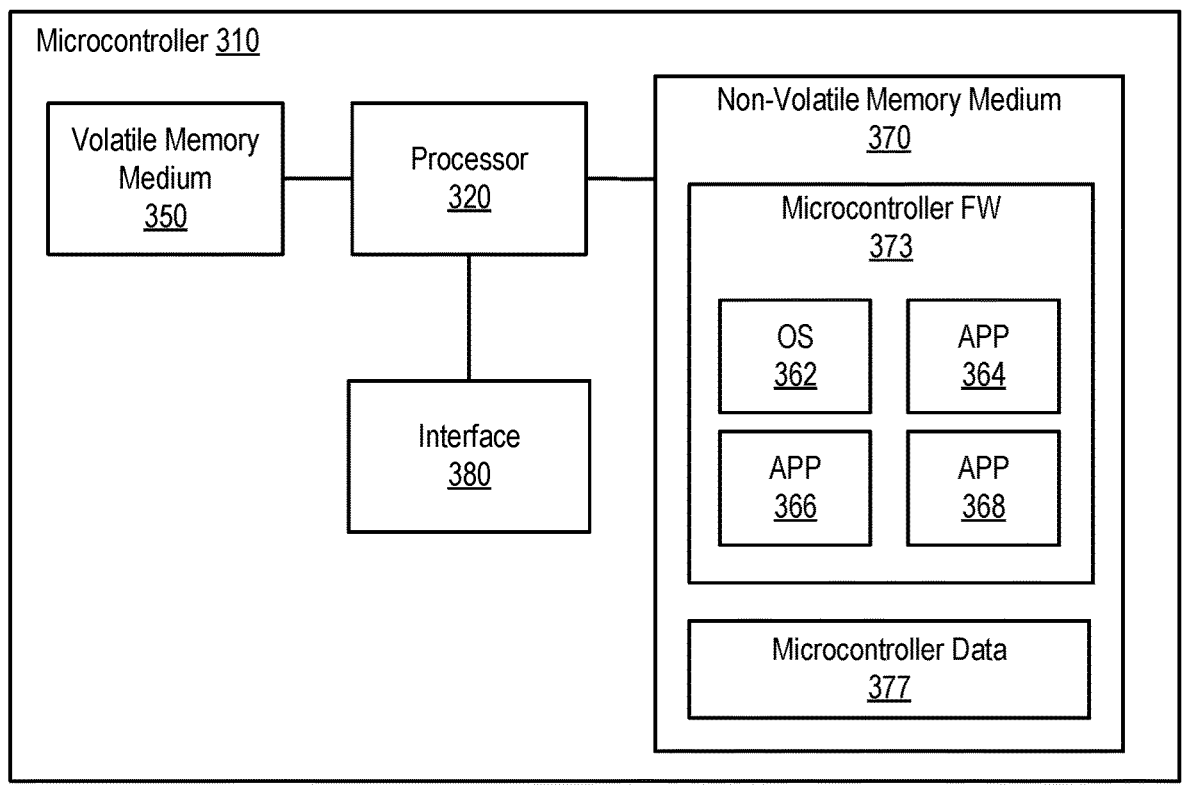
FIG. 3 illustrates an example of a microcontroller, according to one or more embodiments.

Turning now to FIG. 3, an example of a microcontroller is illustrated, according to one or more embodiments. Examples of a microcontroller 310 may include a Microchip Technology Incorporated MEC5105, an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. As shown, microcontroller 310 may include a processor 320, a volatile memory medium 350, a non-volatile memory medium 370, and an interface 380. As illustrated, non-volatile memory medium 370 may include a microcontroller firmware (FW) 373, which may include an OS 362 and APPs 364-368, and may include microcontroller data 377. In one example, OS 362 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In another example, OS 362 may be or include a portable operating system interface (POSIX) compliant operating system.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In another example, interface 380 may include circuitry that enables one or more interrupt signals to be received. In one instance, interface 380 may include general purpose input/output (GPIO) circuitry, and the GPIO circuitry may enable one or more interrupt signals to be received and/or provided via at least one interrupt line. In another instance, interface 380 may include GPIO circuitry that may enable microcontroller 310 to provide and/or receive signals associated with other circuitry. In a third example, interface 380 may include circuitry that enables communicatively coupling to one or more networks. In one instance, interface 380 may include circuitry that enables communicatively coupling to network interface 180.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with at least a portion of one or more systems, at least a portion of one or more flowcharts, one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may execute instructions in accordance with at least a portion of one or more of systems, flowcharts, at least a portion of one or more methods, and/or at least a portion of one or more processes described herein. For example, non-volatile memory medium 370 and/or volatile memory medium 350 may store instructions that may be executable in accordance with at least a portion of one or more of systems, at least a portion of one or more flowcharts, at least a portion of one or more methods, and/or at least a portion of one or more processes described herein. In one or more embodiments, processor 320 may utilize microcontroller data 377. In one example, processor 320 may utilize microcontroller data 377 via non-volatile memory medium 370. In another example, one or more portions of microcontroller data 377 may be transferred to volatile memory medium 350, and processor 320 may utilize microcontroller data 377 via volatile memory medium 350.

Figure 4:
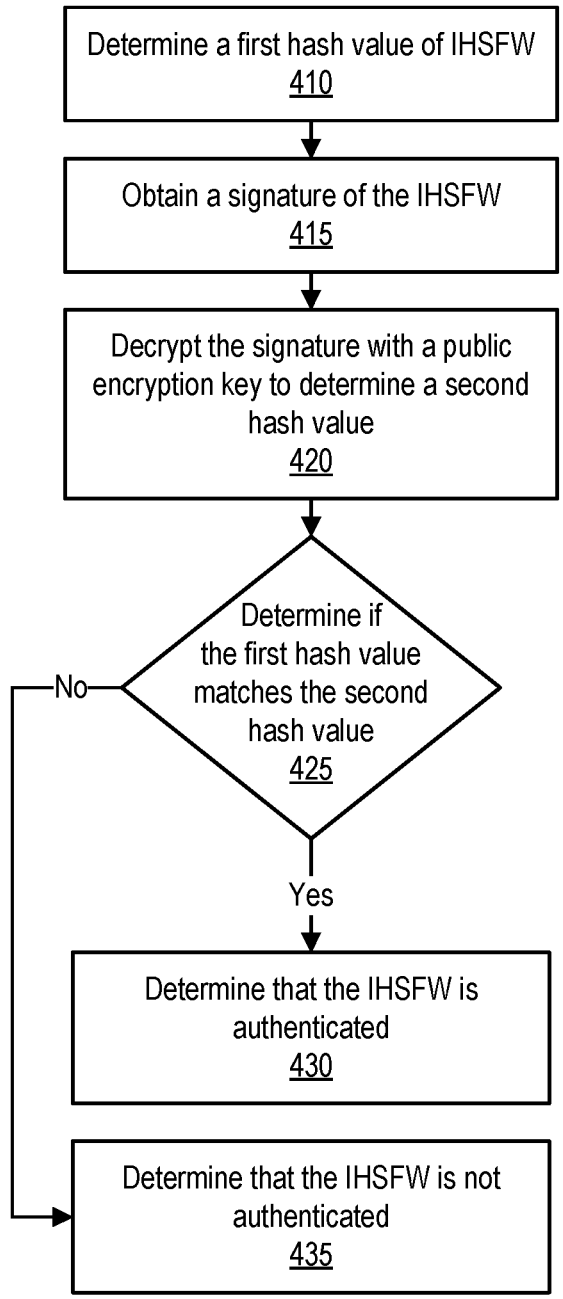
FIG. 4 illustrates an example of a method of authenticating information handling system firmware, according to one or more embodiments.

Turning now to FIG. 4, an example of a method of authenticating information handling system firmware is illustrated, according to one or more embodiments. At 410, a first hash value of IHSFW may be determined. For example, HWRoT device 140 may determine a first hash value of IHSFW 172. For instance, HWRoT device 140 may utilize IHSFW 172 as input to a one-way hash function to determine the first hash value of IHSFW 172.

In one or more embodiments, a one-way hash function may be considered collision free. For example, the one-way hash function may be injective or one-to-one. For instance, $h(z_1)$ and $h(z_2)$ may produce different values, where inputs $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, etc.), and a SNE-FRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1 = h_2(h_3(h_4(z)))$. For instance, a one-way hash function that is a composite function of two or more one-way hash functions may be considered to be and/or said to be strengthened.

At 415, a signature of the IHSFW may be obtained. For example, HWRoT device 140 may obtain signature 174 of IHSFW 172 from non-volatile memory medium 170. At 420, the signature may be decrypted with a public encryption key to determine a second hash value. For example, HWRoT device 140 may decrypt signature 174 with public encryption key 141 to determine a second hash value. For instance, a hash value of IHSFW 172 may have been encrypted with a private encryption key to produce signature 174. In one or more embodiments, the private encryption key utilized to produce signature 174 may be associated with public encryption key 141. The private encryption key may be different from public encryption key 141. For example, the private encryption key and public encryption key 141 may be asymmetric encryption keys. In one instance, data encrypted via the private encryption key may be decrypted via public encryption key 141. In another instance, data encrypted via public encryption key 141 may be decrypted via the private encryption key.

At 425, it may be determined if the first hash value matches the second hash value. For example, HWRoT device 140 may determine if the first hash value matches the second hash value. If the first hash value matches the second hash value, it may be determined that the IHSFW is authenticated, at 430. For example, if the first hash value matches the second hash value, HWRoT device 140 may determine that the IHSFW is authenticated. If the first hash value does not match the second hash value, it may be determined that the IHSFW is not authenticated, at 435. For example, if the first hash value does not match the second hash value, HWRoT device 140 may determine that the IHSFW is not authenticated.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a processor; and
a non-volatile memory medium, coupled to the processor, that stores information handling system firmware (IHSFW) executable by the processor;
a power sequencer device; and
a hardware root of trust (HWRoT) device coupled to the power sequencer device;
wherein the power sequencer device is configured to:
determine that a platform reset signal from the processor has been asserted;
determine that a power conservation state from the processor was not asserted within a first amount of time;
determine that an operating system restart occurred;
notify, via a first notification, the HWRoT device to authenticate the IHSFW with a first notification;
assert a resume reset signal to the processor;
wherein the HWRoT device is configured to:
in response to the first notification, authenticate the IHSFW;
wherein the power sequencer device is further configured to:
de-assert a power OK signal to the processor;
remove power from the processor;
determine that the resume reset signal to the processor is de-asserted and that the processor is out of the power conservation state; and
provide power to the processor.

2. The information handling system of claim 1, wherein the HWRoT device is further configured to:
after a runtime reset of the information handling system, determine that a second notification to re-authenticate the IHSFW has not been received within a second amount of time transpiring; and in response to determining that the second notification to re-authenticate the IHSFW has not been received within the second amount of time transpiring, determine that the power sequencer device has been compromised.

3. The information handling system of claim 1, wherein the HWRoT device is further configured to receive the first notification.

4. The information handling system of claim 1,
wherein the power sequencer device is further configured to determine that the power conservation state was de-asserted within a second amount of time; and
wherein the HWRoT device is further configured to determine that the power sequencer device has been compromised.

5. The information handling system of claim 1, wherein, to determine that the resume reset signal to the processor is de-asserted, the power sequencer device is further configured to determine, via an output of a logical AND gate, that the resume reset signal to the processor is de-asserted.

6. The information handling system of claim 5,
wherein the power sequencer device is further configured to provide a first resume reset signal to the logical AND gate;
wherein the HWRoT device is further configured to provide a second resume reset signal to the logical AND gate; and
wherein at least one of the first signal and the second signal is a logical false signal.

7. The information handling system of claim 1, wherein, to authenticate the IHSFW, the HWRoT device is further configured to obtain a signature of the IHSFW from the non-volatile memory medium.

8. The information handling system of claim 7, wherein, to authenticate the IHSFW, the HWRoT device is further configured to:
determine a first hash value of the IHSFW;
decrypt the signature of the IHSFW with a public encryption key to obtain a second hash value; and
determine that the first hash value matches the second hash value.

9. The information handling system of claim 1,
wherein the power sequencer device includes a first microcontroller; and
wherein the HWRoT device includes a second microcontroller, different from the first microcontroller.

10. A method, comprising:
determining, by a power sequencer device, that a platform reset signal from a processor of an information handling system has been asserted;
determining, by the power sequencer device, that a power conservation state from the processor was not asserted within a first amount of time;
determining, by the power sequencer device, that an operating system restart occurred;
notifying via a first notification, by the power sequencer device, a hardware root of trust (HWRoT) device to authenticate information handling system firmware (IHSFW);
asserting, by the power sequencer device, a resume reset signal to the processor;
in response to the first notification, authenticating, by the HWRoT device, the IHSFW;
de-asserting, by the power sequencer device, a power OK signal to the processor;
removing, by the power sequencer device, power from the processor;
determining, by the power sequencer device, that the resume reset signal to the processor is de-asserted and that the processor is out of the power conservation state; and
providing, by the power sequencer device, power to the processor.

11. The method of claim 10, further comprising:
after a runtime reset of the information handling system, determining, by the HWRoT device, that a second notification to re-authenticate the IHSFW has not been received within a second amount of time transpiring; and
in response to the determining that the second notification to re-authenticate the IHSFW has not been received within the second amount of time transpiring, determining, by the HWRoT device, that the power sequencer device has been compromised.

12. The method of claim 10, further comprising:
determining, by the power sequencer device, that the power conservation state was de-asserted within a second amount of time; and
determining, by the HWRoT device, that the power sequencer device has been compromised.

13. The method of claim 10, wherein the determining that the resume reset signal to the processor is de-asserted includes determining, via an output of a logical AND gate, that the resume reset signal to the processor is de-asserted.

14. The method of claim 13, further comprising:
providing, by the power sequencer device, a first resume reset signal to the logical AND gate; and
providing, by the HWRoT device, a second resume reset signal to the logical AND gate;
wherein at least one of the first signal and the second signal is a logical false signal.

15. The method of claim 10, wherein the authenticating, by the HWRoT device, the IHSFW includes obtaining a signature of the IHSFW from a non-volatile memory medium that stores the IHSFW.

16. The method of claim 15, wherein the authenticating, by the HWRoT device, the IHSFW further includes:
determining, by the HWRoT device, a first hash value of the IHSFW;
decrypting, by the HWRoT device, the signature of the IHSFW with a public encryption key to obtain a second hash value; and
determining, by the HWRoT device, that the first hash value matches the second hash value.

17. The method of claim 10,
wherein the power sequencer device includes a first microcontroller; and
wherein the HWRoT device includes a second microcontroller, different from the first microcontroller.

18. A microcontroller, comprising:
a processor; and
a non-volatile memory medium, coupled to the processor, that stores instructions that, when executed by the processor, cause the microcontroller to:
determine that a platform reset signal from a processor of an information handling system has been asserted;
determine that a power conservation state from the processor of the information handling system was not asserted within a first amount of time;
determine that an operating system restart occurred;
notify, via a notification, a hardware root of trust (HWRoT) device to authenticate information handling system firmware of the information handling system;

assert a resume reset signal to the processor of the information handling system;

de-assert a power OK signal to the processor of the information handling system;

remove power from the processor of the information handling system;

determine that the resume reset signal to the processor of the information handling system is de-asserted and that the processor of the information handling system is out of the power conservation state; and provide power to the processor of the information handling system via at least one voltage regulator.

19. The microcontroller of claim 18, wherein, to determine that the resume reset signal to the processor is de-asserted, the instructions further cause the microcontroller to determine, via an output of a logical AND gate, that the resume reset signal to the processor of the information handling system is de-asserted.

* * * * *